United States Patent [19]

De Keyser

[11] Patent Number: 5,413,828
[45] Date of Patent: May 9, 1995

[54] PLASTIC ARTICLE HAVING FLAME RETARDANT PROPERTIES

[75] Inventor: Francois De Keyser, Overijse, Belgium

[73] Assignee: Monsanto Europe S.A./N.V., St. Louis, Mo.

[21] Appl. No.: 835,151

[22] Filed: Feb. 13, 1992

[30] Foreign Application Priority Data

Nov. 7, 1991 [EP] European Pat. Off. ............ 91870176

[51] Int. Cl.$^6$ .................. B29D 22/00; B32B 3/26; B32B 27/00; B27N 9/00
[52] U.S. Cl. .................. 428/36.5; 428/35.7; 428/305.5; 428/319.3; 428/319.7; 428/921; 428/36.91; 428/523; 252/606; 252/609
[58] Field of Search .......... 428/35.5, 36.5, 305.5, 428/319.3, 319.7, 921; 252/606, 609; 523/179; 521/57, 907; 200/DIG. 24

[56] References Cited

U.S. PATENT DOCUMENTS

| | | | |
|---|---|---|---|
| 4,254,177 | 3/1981 | Fulmer | 428/305.5 |
| 4,265,963 | 5/1981 | Matalon | 521/85 |
| 4,816,312 | 3/1989 | Annemaier et al. | 252/606 |

*Primary Examiner*—George F. Lesmes
*Assistant Examiner*—Kathryne E. Shelborne
*Attorney, Agent, or Firm*—W. Brooks

[57] ABSTRACT

New plastic articles are disclosed and claimed having flame retardant properties which contain a core of a plastic polymeric material (thermoplastic, thermoset, rigid foam or semi-flexible foam polymeric material) which is coated with a protective, flame retardant layer comprising a mixture of a thermoplastic polymeric material and a flame retardant, char-forming, intumescent system. The new articles are suitable for the manufacture of e.g. rods, beams, pipes, hoses, non-tubular profiles and panels which are useful in various industries such as the building, automotive and mining industries.

12 Claims, No Drawings

PLASTIC ARTICLE HAVING FLAME RETARDANT PROPERTIES

This invention relates to a plastic article having flame retardant properties, in particular to an article containing a polymeric material coated with a protective, flame retardant polymeric layer which comprises an intumescent system.

Each year many fatal accidents and huge damages to private properties and industrial installations are caused by fire. This is particularly the case where plastic articles are involved, because many plastic articles are highly flammable, generate dense, toxic and corrosive smoke when burning, rapidly lose their mechanical strength under the effect of heat, and easily propagate fire through dripping.

To remedy this situation there is a general market demand as well as a steadily increasing legislation towards the use of fire resistant or flame retardant plastic articles in houses and in industry, for example in applications such as e.g. frames, pipes, electrical cable hoses, insulation coatings and insulation panels.

The term plastic material used herein refers to thermoplastic polymeric material, to thermoset polymeric material as well as to polymeric rigid foam and semi-flexible foam material. The term plastic article refers to an article the core of which is made from the said plastic material.

Various techniques have been developed to impart flame retardancy or fire resistancy to plastic articles. These techniques are based on the knowledge that certain materials are not combustible and/or are capable on their own or in combination with other compounds to impart flame retardant or fire resistant properties to materials which have been used in connection with such compounds or combinations of compounds. The terms fire resistant (FR) and flame retardant (FR) are used herein interchangeably. The term FR materials refers to materials which have been used in connection with, or treated or modified by means of certain chemical compounds or mixtures of compounds (systems) to show reduced combustion rate compared to the corresponding non-treated or non-modified materials. Similarly the terms FR agent and FR system refer to a chemical compound, respectively mixture of compounds, which imparts to the material which has been used in connection with or treated or modified with the FR agent or FR system, a reduced combustion rate compared to the corresponding non-treated or non-modified material.

A typical way to impart FR properties to plastic articles consists in the manufacture of the articles from plastic materials which have inherent FR properties. Such FR plastic materials contain halogen atoms or various other functional groups, e.g. phthalimide groups, which provide FR properties to the plastic material. The most widespread inherent FR plastic material is polyvinyl chloride. Non-halogen containing inherent FR plastic materials have, for various reasons, not gained widespread application.

Another way to render plastic articles flame retardant consists in preparing the articles from a mixture of a flammable plastic material and a FR agent, FR system or flame retardant, intumescent (FRI) system.

A typical group of FR agents comprises mono- and poly-halogenated compounds having a high content of halogens, usually chlorine and/or bromine, fluorine being used to a lesser extent. These FR agents can be low-molecular weight compounds as well as high-molecular weight, polymeric materials. A further group of FR agents comprises phosphorus containing compounds, such as e.g. derivatives of phosphoric acid and polyphosphoric acid. Another widely used group of FR agents comprises metal derivatives, such as e.g. hydrated alumina, magnesium hydroxide, calcium carbonate and, in particular, antimony salts. Furthermore non-flammable fillers may be added to the mixture, such as mineral fillers. These various FR agents can be used alone or in combination with each other.

In spite of a significant reduction of flammability of the plastic articles obtained by the above techniques, such approaches show considerable weaknesses. A major weakness relates to the reduction in physical and mechanical properties of the plastic material due to the presence of the FR agent, FR system or non-flammable filler. A further disadvantage of plastic articles containing halogenated organic compounds and/or certain metal derivatives, particularly antimony compounds, relates to the fact that these articles generate dense and toxic smokes upon exposure to fire. Another important disadvantage of these articles relates to the fact that they rapidly lose mechanical properties when they are exposed to excessive heat. The terms excessive heat and heat are used herein interchangeably.

Still a further group of FR agents comprises FRI system, i.e. systems which have flame retardant, char-forming and intumescent properties. A plastic mass containing a flame retardant, char-forming and intumescent (FRI) system will under the effect of heat (fire) expand to form a non-flammable, multi-cellular layer of a char-foam which provides an efficient shielding and insulation for the underlaying material against direct contact with fire and oxygen, as well as against heat transfer.

The requirements for flame retardant, char-forming, intumescent systems are well known: these FRI systems contain three components:
 (i) a catalyst, usually phosphoric or polyphosphoric acid, which is present in the form of a non-corrosive acid precursor which under the action of heat is transformed into a phosphorus acid; the latter initiates/catalyses the intumescent reaction;
 (ii) a char-former, also referred to as carbonific compound, which is an organic compound which under the action of the phosphorus acid and heat is transformed into a char;
 (iii) a blowing agent which under the effect of heat and/or the catalyst evolves non-flammable gases which can promote char-foam formation while the char is formed.

By appropriate selection of the components, efficient FRI system can be obtained which are free of halogen and undesirable metal derivatives, and which can be tailored as to the temperature at which the FRI system becomes active. In some FRI systems two components, e.g. the char-former and the blowing agent, are combined in a single chemical compound.

This approach also has significant weaknesses. The main disadvantage of an article made from a mixture of a plastic material and a FRI system resides in the fact that the presence of the FRI system can adversely affect the mechanical properties of the plastic material. Furthermore this approach requires the use of considerable amounts of FRI system and is thus a quite expensive way to impart flame retardancy to articles made from plastic material.

A further way to impart FR properties to plastic articles consists in a surface treatment of the article including the application of a FR or FRI paint layer which is generally applied onto the article by means of a brush, a roller or a spray. However these paint layers are not very satisfactory because they present one or more of the following disadvantages:

- they contain halogenated compounds and/or undesirable metal derivatives,
- the adhesion of the paint layers onto plastic articles is often unsatisfactorily,
- the paint layers are subject to mechanical damage during installation and handling of the article,
- when exposed to water or a humid atmosphere, compounds present in the paint layer such as e.g. phosphorus compounds may hydrolyse and/or may be leached out,
- under the influence of various factors the paint layer may peel off, leaving parts of the plastic article unprotected.

It is an object of this invention to provide a plastic article made from flammable plastic material, having effective flame retardant properties while substantially maintaining, upon exposure to fire its mechanical properties.

It is another object of this invention to provide a method for the manufacture of a plastic article having effective flame retardant properties.

It is a particular object of this invention to provide a plastic pipe having effective flame retardant properties which can be used in mining applications in lieu of e.g. cast iron pipes.

In one aspect, this invention relates to a plastic article having effective flame retardant properties which contains a core of plastic material which is coated with a protective, flame retardant polymeric layer, the layer comprising a thermoplastic polymeric material which contains a flame retardant, char-forming, intumescent system (hereinafter referred to as FRI system and FRI layer, respectively).

In a preferred aspect, this invention relates to a plastic article having effective flame retardant properties which contains a core of plastic material which is coated with a protective, flame retardant thermoplastic polymeric layer which comprises a polyolefin and a FRI system.

The plastic material forming the core can be any thermoplastic polymeric, thermoset polymeric, rigid-foam or semi-flexible foam polymeric material, which materials may be reinforced or not. Suitable thermoplastic materials are, for example, polyethylene, polypropylene, polystyrene, acrylonitrile-butadiene-styrene copolymers, poly-alpha-methyl-styrene, polyvinyl chloride, poly(meth)acrylates, poly-acrylonitrile, polyamides, polycarbonates, and any blends of two or more thermoplastic polymers. Suitable thermoset polymeric materials include, for example, epoxy resins, polyurethanes, high-hardness rubber, phenolic resins, and cross-linked polyesters. Suitable rigid-foam and semi-flexible foam polymeric materials include, for example, phenolic foams, polyurethane foams and polystyrene foams.

Reinforcement of the plastic materials may be achieved in conventional manner, for example by means of mineral fillers and/or fibrous materials, such as e.g. talc, clays, glass-fibers, carbon-fibers, mineral fibrous material, plastic fibers, textile fibers or metal filaments. The fibrous material may be used in the form of continuous strands, woven or non-woven or meshed sheets or randomly distributed chopped fibers. The surfaces of these fibrous reinforcement materials may furthermore be treated in a conventional manner to improve adhesion between the fibrous material and the plastic material.

The core material may furthermore contain conventional additives used in the art, such as e.g. plasticisers and anti-oxidants.

The core may exist in a wide variety of forms. Typical forms are for example rods, beams, pipes, hoses, non-tubular profiles and panels. The core shall be coated with the polymeric layer at least at the surface or surfaces which may become directly exposed to fire and/or heat; preferably the core shall be coated at the complete outer and/or inner surface.

The most appropriate nature and grade of the plastic material and of possibly present reinforcement material, as well as the form and thickness of the core, may vary widely from article to article, and can be defined by the skilled person in conventional manners having regard to the intended use of the article.

In one preferred aspect, the invention relates to a plastic article the core of which comprises a thermoplastic polymeric material.

In another preferred aspect the invention relates to a plastic article with a core comprising a thermoset polymeric material.

In a further preferred aspect the invention relates to a plastic article the core of which comprises a rigid-foam polymeric material or a semi-flexible foam polymeric material.

The protective FRI layer according to the invention may comprise any thermoplastic polymeric material. In a preferred embodiment the thermoplastic polymeric material is halogen-free. In another preferred embodiment the thermoplastic polymeric material comprises a polyolefin. Particularly suitable materials are, for example, polyethylene, HDPE, LDPE, polypropylene, EVA (ethylene vinyl acetate), ethylene hexene copolymers, any mixture thereof, and any mixture with other thermoplastic polymeric materials. If the core comprises a thermoplastic polymeric material, the FRI layer may comprise the same or a different thermoplastic polymeric material.

The FRI polymeric layer may furthermore contain conventional additives used in the art such as e.g. UV-stabilisers, colouring agents, pigments, anti-oxidants and plasticisers.

While various flame retardant, char-forming, intumescent systems (FRI systems) are known, not all of them are appropriate for use according to the invention. Suitable FRI systems have (i) to be compatible with the thermoplastic polymeric material of the layer, (ii) to be thermally stable under the processing conditions, and (iii) provide efficient flame retardancy. The selection of appropriate FRI systems can be made based on publicly available product information and/or routine experiments having inter alia regard to the conditions under which the FRI system shall be active and the FR requirements imposed to the article.

Preferred FRI systems according to this invention contain a phosphoric acid precursor and/or a polyphosphoric acid precursor as catalyst, preferably an ammonium phosphate and/or ammonium polyphosphate (APP). APP is particularly suited as catalyst for FRI systems in polymeric materials containing a polyolefin, in particular polyethylene, polypropylene or any mixture thereof.

Protective polymeric layers containing only a mixture of APP and a thermoplastic polymeric material (APP acting herein as catalyst and blowing agent and the polymeric material acting as char-former) present acceptable FR properties but poor char-foam forming properties. FRI layers containing an FRI system composed of APP, melamine and pentaerythritol, provide improved flame-retardant properties to polymeric layers but also present undesirable technical weaknesses resulting from the fact that melamine and pentaerythritol often do not disperse well in thermoplastic polymers and polymer mixtures and can cause processing problems.

Preferred FRI layers for use according to the invention comprise FRI systems containing APP and a synergist. The term synergist used herein refers to a single compound which acts both as a char-forming agent and as a blowing agent. These two-component FRI systems are preferred over three-component FRI-systems because the APP-synergist system often presents much better compatibility with the thermoplastic polymeric material than three component mixtures of separate catalysts, char-formers and blowing agents do. Various compounds may be used as synergists provided they are compatible with the APP and the thermoplastic polymeric material and provided they do not have an adverse effect on the processed FRI layer such as surface blooming, plate-out effects and decomposition or discoloration at the temperatures required for processing of the polymeric layer. The suitability of synergist compounds in a certain thermoplastic polymer or polymer mixture can be determined by the skilled person based on routine experiments. Preferred synergists are compounds which are halogen-free. Typical synergists are for example oligomeric triazinilpiperazine compounds, silicone fluids, isocyanurates, e.g. triglycidylisocyanurate (TGIC) and tris (hydroxyethyl) isocyanurate (THEIC).

The ratio of the components of a FRI system has to be balanced to obtain an optimal effect. The amount of each component of the FRI system depends on various factors including the nature of the catalyst, char-forming agent, blowing agent, or synergist, the nature of the polymeric material and the degree of intumescency and flame retardancy desired. Suitable to optimal ratio of the components of the FRI system, as well as of the ratio FRI system to thermoplastic polymeric material in the FRI layer, can be determined by the skilled person through routine experiments.

FRI systems according to this invention advantageously consist of, expressed by reference to the said FRI system being 100%, from 5% to 50% weight of FRI additive and from 95% to 50% weight of APP and/or ammonium phosphate, preferably from 20% to 50% by weight of FRI additive and from 80% to 50% by weight of APP and/or ammonium phosphate, more preferably from 25% to 40% by weight of FRI additive and from 75% to 60% by weight of APP. By FRI additive is meant herein the synergist or a mixture of the char-forming agent and the blowing agent.

In typical FRI layers according to the invention the thermoplastic polymeric material, which is preferably a polyolefin, represents from 95% to 40% by weight and the FRI system from 5% to 60% by weight expressed to the layer (100%). In a preferred embodiment the thermoplastic polymeric material represents from 80% to 50% weight and the FRI system from 20% to 50% weight of the polymeric layer (100%). The thickness of the polymeric layer to be used to impart effective flame-retardancy depends on the nature of the FRI system the weight ratio FRI system/thermoplastic polymeric material in the layer, and the degree of intumescency and flame retardancy desired. The thickness can be defined by the skilled person on the basis of routine experiments.

For many applications a relatively thin FRI layer providing a good height and quality of intumescency is sufficient to impart adequate flame retardant properties to the plastic article.

The following are examples of FRI layer compositions, of compounding processes for the manufacture of FRI layers and of flame retardant thermoplastic polymeric FRI layer material.

EXAMPLE 1

Components:
  Thermoplastic polymer: polypropylene (a)
  FRI system: mixture of ammonium polyphosphate (b) and oligomeric triazinilpiperazine derivative (c)
  FRI system composition: weight ratio (b):(c) approx. 2:1
  a) General compounding procedure:
  Approximately 1250 g of a polymer (a)/FRI system powder mixture is added to a Banbury mixer at 55°-65° C. The batch temperature is increased to 155°-160° C. and maintained for 4 to 6 minutes. Care is taken not to exceed 200° C. The batch is removed from the mixer, cooled and ground into chips. A second pass, using similar conditions, may be required if powder losses are significant during the first pass (e.g., if unmixed powder exceeds 10-20 g), or if dispersion is inadequate.

Specimens of appropriate dimensions for testing flame retardancy and physical properties result from conventional injection molding at temperatures of 210°-215° C.

b) Specific example (FRI system load: 20% wt): Sample 1: According to the above general procedure the following sample is made: 1000 g polypropylene (a) and 250 g FRI system were added to a Banbury Mixer at 50° C. The batch temperature was increased to 150° C. in one minute using a rotation of 77 rpm. Rotation was stepped up, as necessary, to maintain this temperature for an additional five minutes. The batch was removed from the mixed, partially cooled, chopped using a bench hydraulic guillotine and ground into chips.

Injection-molded test specimens were made in a conventional manner under the following conditions : barrel and nozzle temperatures were 210°-215° C.; injection pressure was 12,066 KPa (1750 psi). The final composition of the resulting FRI layer material (Sample 1) was 80% by weight polypropylene, 20% by weight total FRI system.
  (a) Himont PRO-FAX 6524: Trademark of Himont USA, Inc.
  (b) Phos-Chek P/40: Trademark of Monsanto Company
  (c) Spinflam SPINFLAM MF82/PP: Trademark of Ausimont Group, Montedison SpA

EXAMPLE 2

Components:
  Thermoplastic polymer: polypropylene (a)

FRI system: ammonium polyphosphate (b) SFR-100 Silicone fluid (d) pentaerythritol (e)

FRI system composition: weight ratio (b):(d):(e) approx. 3:1:1 a) General compounding procedure:

Using a Banbury Mixer, two passes are required. The first pass is made at 150°-165° C. without the silicone-based additive (d) in the mixture. The ground material from the first pass is added back to the mixer and heated to about 170° C., then SFR-100 silicone fluid (d) is added, and mixing is continued at 170° C. for an additional 4 to 6 minutes.

The batch is removed from the mixer, cooled, chopped, ground into chips and injection molded as described in example 1.

b) Specific example (FRI system load: 25% wt): Sample 2:

37.5 g polypropylene (a), 187.5 g ammonium polyphosphate (b) and 62.5 g pentaerythritol (e), were mixed in a Banbury mixer at 150°-165° C. for four minutes, followed by cooling and grinding.

In a second pass, chips from the first pass were heated to 170° C. in four minutes, at which time 62.5 g of silicone fluid (d) was added. The mixture was mixed for an additional four minutes at 170° C. followed by cooling, grinding and injection molding as described in example 1.

The resulting FRI-layer material (Sample 2) had a final composition of 75% polypropylene (a), 15% ammonium polyphosphate (b), 5% silicone fluid (d) and 5% pentaerythritol (e).

(a) Himont PRO-FAX 6524: Trademark of Himont USA, Inc.
(b) Phos-Chek P/40: Trademark of Monsanto Company.
(d) SFR-100 Silicone fluid: Trademark of GE Silicones, General Electrics.
(e) PE-200 pentaerythritol, technical grade:Hercules Inc./Aqualon

EXAMPLE 3

Physical properties measured on injection molded samples prepared according to examples 1 and 2 are given below in Table 1.

TABLE 1

| Physical properties of injection molded FRI layer samples | | | | |
|---|---|---|---|---|
| | ASTM METHOD | PP resin (a) | Sample 1 | Sample 2 |
| FLAME RETARDANT PROPERTIES | | | | |
| UL 94 Flame Class (1/16") | — | Burn | V-0 | V-0 |
| Oxygen Index (%) | D 2863 | 18.7 | 32.5 | 28.1 |
| PHYSICAL PROPERTIES | | | | |
| Specific gravity | D 792 | 0.88 | 0.97 | 0.99 |
| Tensile properties | D 638 | | | |
| Tensile strength (psi) | | | | |
| Yield | | 4,827 | 4,315 | 3,555 |
| Break | | 1,965 | 3,272 | 2,267 |
| Elongation (%) Break | | 7.9 | 2.3 | 11.2 |
| Izod Impact Strength | D 256 | | | |
| Notched (ft-lb/in) | | 2.0 | 0.2 | |
| Unnotched (ft-lb/in) | | 12.3 | 4.3 | 7.8 |
| Melt Flow | D 1238 | 4.0 | 3.2 | 6.2 |

TABLE 1-continued

| Physical properties of injection molded FRI layer samples | | | | |
|---|---|---|---|---|
| | ASTM METHOD | PP resin (a) | Sample 1 | Sample 2 |
| (g/10 min.) | | | | |

(a) Polypropylene resin (PRO-FAX 6524: Trademark of Himont USA, Inc). comparative sample/data.

EXAMPLE 4

Components:
Thermoplastic polymer: LDPE (low density polyethylene) (f)
FRI system: ammonium polyphosphate (b) oligomeric triazinilpiperazine derivative (c)
FRI system composition: weight ratio (b):(c) is approx 2:1 a) General compounding procedure:

Approximately 1250 g polymer (f)/FRI system powder mixture are mixed in a Banbury mixer at 100° C. The batch temperature is increased to 150°-160° C. and maintained for five minutes. Care is taken not to exceed 177° C. The batch is removed from the mixer, cooled and ground into chips. A second pass, using similar conditions, may be required if powder losses are significant during the first pass (e.g., if unmixed powder exceeds 10-20 g), or if dispersion is inadequate.

Specimens of appropriate dimensions for testing flame retardancy and physical properties are injection molded at temperatures of about 182° C.

b) Specific example (FRI system load: 30%): Sample 3: According to the above general procedure the following sample is made:

875 g of LDPE (f) and 375 g of FRI system were added to a Banbury Mixer at 100° C. The FRI system blend consisted of approximately 2:1 ammonium polyphosphate (b): synergist (c). The batch temperature was increased to 154° C in 3 to 5 minutes using a rotation of 77 rpm. Rotation was stepped up, as necessary, to maintain this temperature for an additional five minutes. The batch was removed from the mixer, partially cooled, chopped using a bench hydraulic guillotine and ground into chips with a grinder.

Injection-molded test specimens were made in a conventional way under the following conditions: barrel and nozzle temperatures were 170° C. and 230° C., respectively; injection pressure was 12,066 KPa (1750 psi). The final composition of the resulting FRI layer material (Sample 3) was 70% LDPE, 30% FRI system.

(b) PHOS-CHEK P/40: Trademark of Monsanto Company
(c) SPINFLAM MF82/PE: Trademark of Ausimont Group, Montedison SpA.
(f) Grade LDPE 779, Dow Chemical Co.

Physical properties measured on sample 3 are given in Table 2.

TABLE 2

| Physical Properties of injection molded FRI layer sample 3 | | | |
|---|---|---|---|
| | ASTM METHOD | LDPE (f) | Sample 3 |
| FLAME RETARDANT PROPERTIES | | | |
| UL 94 Flame Class (1/16") | — | Burn | V-0 |
| Oxygen Index (%) | D 2863 | 18.8 | 35.6 |

TABLE 2-continued

Physical Properties of injection molded FRI layer sample 3

| | ASTM METHOD | LDPE (f) | Sample 3 |
|---|---|---|---|
| Smoke Optical Density | E 662 | | |
| Flaming Mode | | 52 | |
| Nonflaming Mode | | 257 | 73 |
| PHYSICAL PROPERTIES | | | |
| Specific gravity | D 792 | 0.92 | 1.06 |
| Tensile properties | D 638 | | |
| Tensile strength (psi) | | | |
| Yield | | 1,550 | 1,420 |
| Break | | 1,410 | 1,395 |
| Elongation (%) | | | |
| Yield | | 105 | 15 |
| Break | | 140 | 45 |
| Izod Impact Strength | D 256 | | |
| Notched (ft-lb/in) | | NB* | 2.0 |
| Unnotched (ft-lb/in) | | NB* | 12.0 |
| Melt Flow, g/10 min. | D 1238 | 6.4 | 4.4 |

(f) low density polyethylene LDPE Grade 779, Dow Chemical Co. comparative sample/data.
*NB: sample not broken

EXAMPLE 5

In Table 3 samples of FRI layer material are presented which have been prepared by conventional techniques in accordance with the procedure described in Example 4.

In Table 4 physical properties are presented measured on injection molded specimen of Samples 4 to 7.

TABLE 3

Samples of compounded FRI layer material

| Sample No | Thermoplastic polymer | % weight load in FRI layer | FRI System % weight of components APP (b) | synergist (c) |
|---|---|---|---|---|
| 4 | HDPE (g) | 30 | 69.2 | 30.8 |
| 5 | HDPE (g) | 40 | 69.2 | 30.8 |
| 6 | HDPE (h) | 30 | 69.2 | 30.8 |
| 7 | HDPE (h) | 40 | 69.2 | 30.8 |

(g) HDPE (3 MFI): Alathon 7030 (Du Pont Company)
(h) HDPE (0.5 MFI): Alathon 5850 (Du Pont Company)
(b) ammonium polyphosphate (Phos-Check ® P/40 : Monsanto Company)
(c) triazinilpiperazine derivative Spinflam ® MF82 Ausimont SpA)

TABLE 4

Physical properties of typical injection molded FRI layer material

| Property | ASTM Method | Units | HDPE MFI 3 (g) | Sample 4 | Sample 5 | HDPE MFT 0.5 (h) | Sample 6 | Sample 7 |
|---|---|---|---|---|---|---|---|---|
| Meltflow Condition (L) | D-1238 | g/10 min | 2.8 | 1.74 | 1.51 | 1.43 | 0.380 | 0.386 |
| Density | D-792 | g/cc | 0.96 | 1.08 | 1.14 | 1.16 | 1.08 | 1.13 |
| Tensile strength Ultimate (2"/min) | D-638 | psi | 4200 | 2900 | 2800 | 2900 | 3000 | 3000 |
| Elongation (2"/min) | D-638 | % | 900 | 165 | 20 | 13.7 | 69 | 56 |
| Gardner Impact Resistance | — | in-lb | — | 71 | 18 | 12 | 50 | 17 |
| Notched Izod R.T. | D-256 | ft-lbs/in | 1.89 | 1.12 | 0.887 | 1.35 | 2.64 | 2.33 |
| Flexural Modulus R.T. | D-790 | 1000 · psi | 222 | 180 | 250 | 276 | 200 | 250 |
| UL 94 test (⅛") | UL94 | | — | V-0 | V-0 | | V-0 | V-0 |
| (1/16") | | | | V-0 | V-0 | | V-2 | V-0 |
| Oxygen Index | | % | | 31.8 | 37.2 | | 31.0 | 36.2 |
| Moisture before drying | | % | | 0.80 | 1.14 | 4.2 | 2.51 | 6.61 |
| Moisture after drying | | % | | 0.14 | 0.16 | 0.77 | 0.19 | 0.31 |

(g) HDPE (3 MFI): Alathon 7030 (Du Pont Company); comparative sample/data
(h) HDPE (0.5 MFI): Alathon 5850 (Du Pont Company); comparative sample/data In a preferred aspect this invention relates to plastic pipes having flame retardant properties, having a core made of polymeric material which is coated with an outer protective, flame retardant thermoplastic polymeric layer which comprises a polyolefin, a mixture of polyolefins, or a mixture of a polyolefinic material with any other thermoplastic polymeric material, and a flame retardant, char-forming, intumescent system. Pipes according to the invention may have various inner and outer diameters and they are very suitable for various applications in industry and in houses, for example for use under humid conditions in mines as conducts for air and water.

In another preferred aspect this invention relates to flame-retardant, non-tubular plastic profiles, having a core from a polymeric material with a protective polymeric layer having flame-retardant properties and comprising a thermoplastic polymeric material containing a flame retardant, char-forming, intumescent system.

The profiles are very suitable for the manufacture of frames for various applications, e.g. frames for windows and doors for the building industry.

In still another preferred aspect this invention relates to plastic hoses having flame retardant properties having a core made of a polymeric material which is coated at the inner side or at the inner and outer si de with a protective, polymeric layer having flame retardant properties, the polymeric layer comprising a thermoplastic polymeric material containing a flame retardant, char-forming intumescent system.

Such hoses may be of particular interest for housing electrical wires in buildings, in the automotive industry and in special equipment.

The core of the pipe, frame or hose may optionally be reinforced by any suitable material known in the art such as, for example, fibers, chopped fibers, networks, meshed, woven or non-woven sheets from compatible materials like glass fibers, carbon fibers, mineral fibers, textile fibers, fibers from polymeric materials and metal filaments. The polymeric material forming the core may be a halogen containing polymer, e.g. PVC, although halogen-free polymers are preferred. Typically preferred polymers are polyethylene, HDPE, LDPE, propylene, and any mixtures thereof. The polymeric material may furthermore contain one or more other thermoplastic polymers, such as e.g. polycarbonates, polyamides and polyesters, provided they are compatible with the polymeric material.

The thermoplastic polymeric material of the protective FRI layer of such pipes, non-tubular profiles and hoses corresponds to the one described herein before.

Plastic articles, according to the invention having a protective FRI layer, in particular pipes, hoses and non-tubular profiles, can be manufactured at relatively low cost according to known techniques and with conventional equipment. For example, the pipes, hoses and non-tubular profiles according to the invention can be made by extrusion such as sequential extrusion, co-extrusion, crosshead-extrusion, and by jacketing.

The flame retardant plastic articles according to the invention present many advantages over conventional flame retardant articles made from inherently flame retardant halogen containing polymers, or from polymers or polymer blends mixed with FR or FRI systems. The advantages include:

- minimal amounts of FRI system are required to impart effective flame-retardancy to plastic articles; this enables to manufacture the articles at reduced material cost;
- possibility to manufacture flame-retardant plastic articles free of halogens and undesirable metal derivatives;
- quality FRI chars are formed when the article is exposed to fire or excessive heat providing efficient shielding against fire, against fire propagation via dripping and against heat transfer;
- the articles do not evolve dense and toxic smoke or corrosive combustion gases under fire conditions, or the generation thereof is at least significantly retarded and/or reduced by the char-foam layer formed;
- the protective layer containing the FRI system is a thermoplastic polymeric layer which readily resists to mechanical damage;
- the FRI layer can be applied simultaneously or consecutively during the manufacture of the article before installation of the latter which ensures a homogenous, high-quality protective layer;
- the FRI layer does not adversely interfere with the physical and mechanical properties of the core of the article;
- the ease of connecting FR articles according to the invention, e.g. pipes and non-tubular profiles, by conventional techniques without causing much damage to the FRI layer over larger surfaces;
- the flame-retardancy can be tailor made to a certain extent by adaptation of the nature of the FRI system, the ratio of FRI system to thermoplastic polymeric material in the FRI layer, and the thickness of the FRI layer.

The manufacture of typical articles according to the invention is examplified below.

EXAMPLE 6

Flame retardant laminated sheets:
Components:
  Thermoplastic polymer: HDPE (i)
  FRI system: mixture of ammonium polyphosphate (b) and oligomeric triazinilpiperazine derivative (c)
  FRI system composition: weight ratio (b):(c) approx. 2:1
  FRI layer composition:
    Formulation A: weight ratio HDPE: FRI system is 60:40
    Formulation B: weight ratio HDPE: FRI system is 70:30
    Formulation C: weight ratio HDPE: FRI system is 75:25
  (i): HDPE: ELTEX TUB 121 Trademark of Solvay Company (b): Phos-Chek P/40: Trademark of Monsanto Company
  (c): Spinflam MF82/PE (without APP) Trademark of Ausimont SpA The FRI layer material formulations A, B and C were compounded in conventional way as described in example 4.

Laminated sheet samples were prepared by conventional coextrusion of a FRI layer on a 4 mm thick sheet of unmodified HDPE (i) containing carbon black, as follows:
Sample 8: FRI formulation A; FRI layer thickness 1 mm
Sample 9: FRI formulation A; FRI layer thickness 2 mm
Sample 10: FRI formulation B; FRI layer thickness 1 mm
Sample 11: FRI formulation B; FRI layer thickness 2 mm
Sample 12: FRI formulation C; FRI layer thickness 1 mm
Sample 13: FRI formulation C; FRI layer thickness 2 mm In a standard set up plaques of these samples in horizontal position were exposed with the FRI layer to a bunsen burner flame (flame temperature about 1100° C) for 2 to 3 minutes whilst observing the sample and whilst measuring via a thermocouple the temperature at the back of the sample. The test results are summarised in Table 5 below.

TABLE 5

| Flame retardancy presented by laminated sheet samples | | | | |
|---|---|---|---|---|
| Sample no | FRI System % wt* | FRI layer mm** | Back temp (°C.) after 2 min. exposure | Time to softening (min) |
| 8 | 40 | 1 | 122.5 | 2.7 |
| 9 | 40 | 2 | 105 | 3.25 |
| 10 | 30 | 1 | 150 | 2.25 |
| 11 | 30 | 2 | 108 | 3 |
| 12 | 25 | 1 | 170 | 2 |
| 13 | 25 | 2 | 120 | 3 |
| 14*** | 0 | 0 | 200 | <1.5 |

*weight load of FRI system in FRI layer
**thickness of FRI layer
***comparative sample/data

EXAMPLE 7

Flame retardant laminated sheets

Through conventional extrusion comparative samples were made of sheets of HDPE (i) and HDPE (i) containing a FRI system, and, also through conventional coextrusion, samples of flame retardant laminated sheets according to the invention were made as follows:
  the FRI system is ammonium polyphosphate (b) and oligomeric triazinilpiperazine derivative (c) in the weight ratio 2:1.
  the thermoplast in the core and in the FRI layer is the same, i.e. HDPE (Eltex Tub 121: Solvay Company).

| Sample No | Core | FRI-layer Composition | | Thickness of sample in mm | |
|---|---|---|---|---|---|
| | | HDPE % wt | FRI system % wt | Core | FRI layer |
| 15* | HDPE | — | — | 3 | — |
| 16* | — | 60 | 40 | — | 3 |
| 17* | — | 75 | 25 | — | 3 |
| 18 | HDPE | 75 | 25 | 4 | 1 |

-continued

| Sample No | Core | FRI-layer Composition | | Thickness of sample in mm | |
|---|---|---|---|---|---|
| | | HDPE % wt | FRI system % wt | Core | FRI layer |
| 19 | HDPE | 60 | 40 | 4 | 1 |
| 20 | HDPE | 60 | 40 | 4 | 3 |

*Comparative sample/data

In a standard set up plaques of these samples in vertical position were exposed with the FRI layer, if available, to an intensive flame of a propane/butane torch and the changes to the plaques were observed. The results are summarised below:

Sample 15:
  after 1 min 47: flames are visible at the backside
  after 2 min the burner is removed: the fire is self-supporting.
Sample 16:
  a char structure is formed
  after 2 min the burner is removed:
    no flames are visible at the backside
    the sample is slightly deformed but its form is still intact,
    the sample is auto-extinguishing.
Sample 17:
  a char structure is formed
  after 1 min 55 the burner is removed:
    no flames are visible at the backside
    the sample starts dripping.
Sample 18:
  a char-foam structure is formed
  after 2 min the burner is removed:
    no flames are visible at the backside
    the sample is auto-extinguishing
    the sample is not deformed.
Sample 19: idem as for sample 19
Sample 20:
  a char-foam structure is formed
  after 6 min of exposure the burner is removed
    the sample is auto-extinguishing
    the sample is not deformed.

EXAMPLE 8

Flame retardant plastic pipe

A flame retardant plastic pipe according to the invention was made according to the following particulars:
  FRI system composition: ammonium polyphosphate (b) and oligomeric triazinilpiperazine derivative (c) in a weight ratio of 2:1;
  FRI layer composition: thermoplastic polymer HDPE (j) 70% by weight and FRI system 30% by weight (expressed to the total weight (100%) of the thermoplastic polymer plus the FRI system); in addition 1 part of carbon black per hundred parts of thermoplastic polymer plus FRI system was added to the composition.
  The FRI layer material was compounded in a conventional way. A sample of the compounded material passed the UL94 (1/16"; 1.5 mm) and UL94 (1/8"; 3.2 mm) flame test (result V-0).
  Core material: HDPE (j)
    (b) Phos-Check ® P/40: Monsanto Company
    (c) Spinflam ® MF82: Ausimont SpA
    (j) HDPE: mixture, having a melt flow index (MFI) of 1.3, of Alathon ® 7030 and Alathon ® 5850 (Alathon ® trademark of Du Pont Company).

According to standard co-extrusion techniques a flame retardant plastic pipe according to the invention was made. Two single screw extruders were used for the co-extrusion. The polymeric material was predried at about 76° C. for 1.5 hours. The system was started up using the same HDPE polymer in both extruders. Once a consistent pipe was obtained the FRI layer material was fed to the extruder providing the FRI layer of the pipe. The working temperatures were for the extruder providing the FRI layer about 193° C. and for the extruder providing the core about 177° C. The pipe had an outer diameter of 110 mm, an inner diameter of 80 mm and a FRI layer of 2.5 mm thickness.

A sample of about 30 cm length of the obtained flame retardant pipe (sample 21) was subjected to a flammability test as follows: the sample was exposed to an intense flame from a propane torch for 2 to 3 minutes. Periodically the flame was removed and the flame retardancy of the sample was visually inspected. The results are given below in Table 6.

TABLE 6

| Flame retardant properties of HDPE pipe sample 21 | |
|---|---|
| Phenomenon inspected | Results |
| deformation of the article | no |
| fusion of the article | no |
| inflammation of the article | no |
| dripping | no |
| hole burned in the pipe | no |
| outer char-foam layer formed | yes |

The above results clearly show the flame retardant properties and the technical advantages of a flame retardant plastic pipe according to the invention.

Another aspect of the invention relates to structural laminates having flame retardant properties and their manufacture. These laminates have a core of rigid-foam or semi-flexible foam which is coated with a layer of a flame retardant, thermoplastic polymeric material containing a FRI system. The layer may be coating one or both major sides of the laminate and optionally also one or more of the erecting side surfaces. Typical examples of such laminates are rigid-foam and semi-flexible foam panels which are suitable for use as insulation panels in various application, e.g. in the building industry, and in the automative industry.

The laminates can be manufactured by conventional techniques and from conventional foam-forming compositions, as, for example, described in the patents GB 1,197,221; U.S. Pat. Nos. 4,165,413; 4,292,363; GB 1,580,565; U.S. Pat. Nos. 4,438,166; 4,028,158; 3,166,454; 3,874,980; 4,073,997; 4,764,420; 4,221,555; EP 0,118,013; EP 0,146,012 and EP 0,066,967. To manufacture laminates according to the invention, the flame retardant, thermoplastic polymeric layer with the FRI system is applied, according to the processes described in the said patents, either as the facing sheet material, replacing the facing sheet material used in the described processes, or, provided adequate adhesion is ensured, in addition and at the outer side of the described facing sheet material.

Compounded FRI layer material may not be flexible enough to enable its rolling up to larger rolls of FRI layer sheets. It is understood that if this is the case the FRI layer sheet to be used as facing sheet for the laminates may be made by conventional extrusion either previously, followed by its cutting into pieces of sheet having the desired dimensions, or as a first step of a continuous process for the manufacturing of flame retardant laminates.

The core material can be any polymeric rigid-foam or semi-flexible foam, preferable a polymeric rigid-foam, which optionally may contain conventional reinforcement materials. Typical foam materials are for example phenolic foams, polyisocyanate foams, polyurethane foams, polystyrene foams and PVC foams. Typical reinforcement materials are for example glassfibers, carbon fibers, metal filaments, mineral fibers, plastic fibers, and textile fibers, strands of glassfibers, chopped glassfibers, meshed, woven and non-woven sheets or mats of glassfibers, metal gauzes and wire netting.

I claim:

1. A plastic article having flame retardant properties which comprises a core of plastic polymeric material which is coated with a protective, flame retardant layer, characterized in that the flame retardant layer consists essentially of a mixture of a thermoplastic polymeric material selected from the group consisting of a polyolefin and mixtures of polyolefins and a flame retardant, char-forming, intumescent system (FRI system) comprising, as expressed by reference to the FRI system (100%), from 5% to 50% by weight of a flame retardant char-forming, intumescent additive and from 95% to 50% by weight of a catalyst selected from the group consisting of an ammonium phosphate, ammonium polyphosphate and mixtures, thereof.

2. The plastic article according to claim 1 wherein the protective, flame retardant layer comprises, expressed by reference to said layer (100%) from 5% to 60% by weight of the FRI system and from 95% to 40% by weight of the thermoplastic polymeric material.

3. The plastic article according to claim 2 wherein the protective, flame retardant layer comprises from 20% to 50% by weight of the FRI system and from 80% to 50% by weight of the thermoplastic polymeric material.

4. The plastic article according to claim 1 wherein the plastic polymeric material of the core is a thermoplastic polymeric material.

5. The plastic article according claim 1 wherein the plastic polymeric material of the core is a thermoset polymeric material.

6. The plastic article according to claim 1 wherein the plastic polymeric material of the core is in a form selected from the group consisting of a rigid foam and semi-flexible foam.

7. The plastic article according to claim 1 wherein the polymeric material of the core further comprises a reinforcement material.

8. The plastic article according to claim 1 wherein the thermoplastic polymeric material of the protective, flame retardant layer is halogen-free.

9. The plastic article according to claim 1 wherein the polyolefin is selected from the group consisting of polyethylene, HDPE, LDPE, polypropylene, and any mixture thereof.

10. The plastic article according to claim 1 wherein the article is a pipe.

11. The plastic article according claim 1 wherein the article is characterized by a non-tubular profile.

12. The plastic article according to claim 1 wherein the article is a laminate.

* * * * *

UNITED STATES PATENT AND TRADEMARK OFFICE
CERTIFICATE OF CORRECTION

PATENT NO. : 5,413,828

DATED : May 9, 1995

INVENTOR(S) : Francois De Keyser

It is certified that error appears in the above-identified patent and that said Letters Patent is hereby corrected as shown below:

In column 7, line 18, delete "37.5 g" and insert --937.5 g-- therefor.

In column 10, line 21, delete "si de" and insert --side-- therefor.

Signed and Sealed this

Twenty-second Day of August, 1995

Attest:

BRUCE LEHMAN

*Attesting Officer*     *Commissioner of Patents and Trademarks*